US011281295B2

(12) United States Patent
Yee et al.

(10) Patent No.: US 11,281,295 B2
(45) Date of Patent: Mar. 22, 2022

(54) APPARATUS FOR SENSING AND THREE DIMENSIONAL HAPTIC

(71) Applicant: Robert Bosch GmbH, Stuttgart (DE)

(72) Inventors: Seow Yuen Yee, Mountain View, CA (US); Christian Peters, Mountain View, CA (US); Thomas Rocznik, Mountain View, CA (US); Ning Wang, Sunnyvale, CA (US); Timothy Schultz, Sunnyvale, CA (US); Gary Yama, Mountain View, CA (US)

(73) Assignee: ROBERT BOSCH GMBH

( * ) Notice: Subject to any disclaimer, the term of this patent is extended or adjusted under 35 U.S.C. 154(b) by 0 days.

(21) Appl. No.: 16/724,014

(22) Filed: Dec. 20, 2019

(65) Prior Publication Data

US 2021/0191515 A1 Jun. 24, 2021

(51) Int. Cl.
  *G06F 3/01* (2006.01)
  *G06F 3/041* (2006.01)
  *G06F 3/044* (2006.01)
  *B60W 50/16* (2020.01)

(52) U.S. Cl.
  CPC .............. *G06F 3/016* (2013.01); *G06F 3/044* (2013.01); *G06F 3/04162* (2019.05); *B60W 50/16* (2013.01)

(58) Field of Classification Search
  CPC ...... G06F 3/016; G06F 3/04162; G06F 3/044; B60W 50/16
  See application file for complete search history.

(56) References Cited

U.S. PATENT DOCUMENTS

| 2015/0185848 A1* | 7/2015 | Levesque ............ G06F 3/04886 345/173 |
| 2015/0277720 A1* | 10/2015 | Thorson ................ G06F 3/0412 345/174 |
| 2016/0282977 A1* | 9/2016 | Moua .................... G06K 9/0002 |
| 2017/0168572 A1 | 6/2017 | Peshkin et al. |
| 2018/0056176 A1* | 3/2018 | Sakamoto ........... G07F 17/3209 |

* cited by examiner

*Primary Examiner* — Mark W Regn
(74) *Attorney, Agent, or Firm* — Dickinson Wright PLLC

(57) ABSTRACT

A transducer includes one or more actuator components configured to be encompassed by a cavity of a frame, wherein the one or more actuator components are configured to allow in-plane and out-of-plane movement with respect to the frame and configured to create haptic feedback in the in-plane or out-of-plane movement to the frame. The transducer also includes one or more sensing layers configured to detect changes of displacement in the frame, wherein the sensing layer is connected to the one or more actuator components.

20 Claims, 5 Drawing Sheets

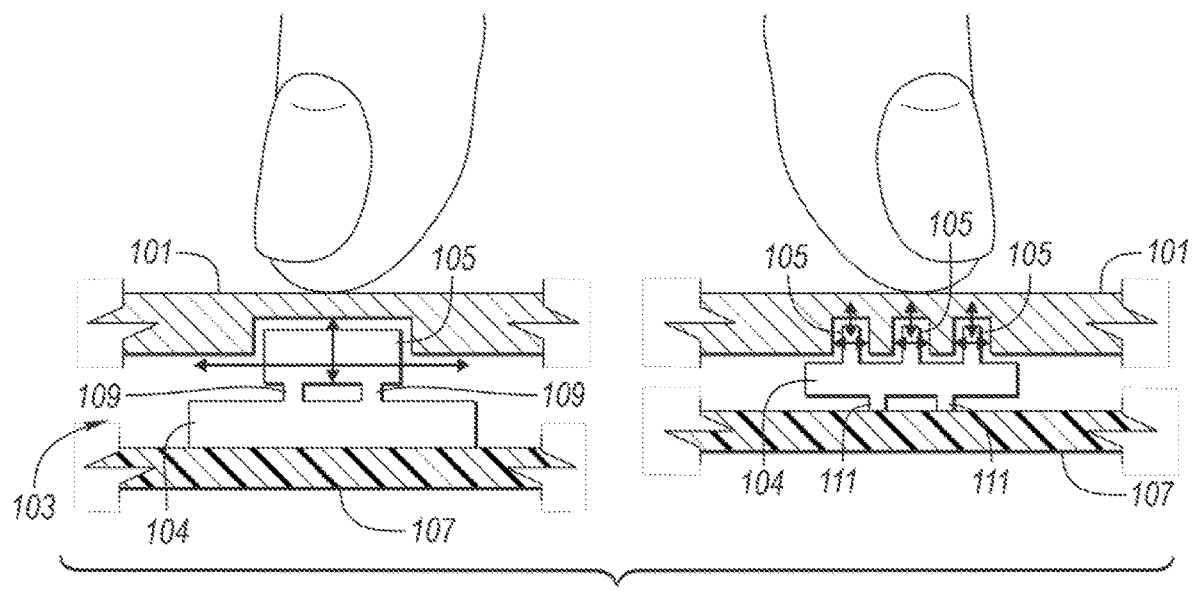
FIG. 2A
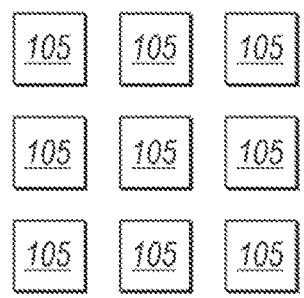
FIG. 2B
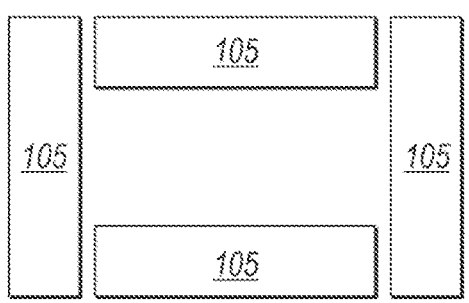　　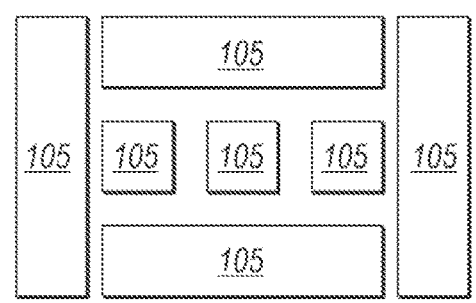
FIG. 2C　　　　　　FIG. 2D

APPARATUS FOR SENSING AND THREE DIMENSIONAL HAPTIC

TECHNICAL FIELD

The present disclosure relates to technology to create sensing and 3D haptic feedback for button replacement and/or other applications.

BACKGROUND

A typical smartphone may have three push buttons on the outside wall of the frame to switch the phone on and off, as well as to control the audio volume. These buttons have drawbacks, such as design limitations due to the mechanical presents of the buttons, milling and/or drilling of the phone frame that requires additional costs for the OEMs, reduced water resistance (and/or dust) of the phone, and lack of interesting/variety of haptic feedbacks.

SUMMARY

According to one embodiment, a transducer includes one or more actuator components configured to be encompassed by a cavity of a frame, wherein the one or more actuator components are configured to allow in-plane and out-of-plane movement with respect to the frame and configured to create haptic feedback in the in-plane or out-of-plane movement to the frame. The transducer also includes one or more sensing layers configured to detect changes of displacement in the frame, wherein the sensing layer is connected to the one or more actuator components.

According to a second embodiment, a mobile device includes a frame defining an outer edge of a phone, wherein the frame includes a cavity, one or more actuator components configured to be encompassed by the cavity of the frame, wherein the one or more actuator components are configured to allow in-plane and out-of-plane movement with respect to the frame and configured to create haptic feedback in the in-plane or out-of-plane movement to the frame in response to input at the frame, and one or more sensing layers configured to detect changes of displacement in the frame, wherein the sensing layer is connected to the one or more actuator components.

According to a third embodiment, a transducer includes one or more actuator components configured to protrude into a cavity of a frame, wherein the one or more actuator components are configured to allow in-plane and out-of-plane movement with respect to the frame and configured to create haptic feedback in the in-plane or out-of-plane movement to the frame in response to input at the frame, a sensing layer configured to detect changes of displacement in the frame, wherein the sensing layer is connected to the one or more actuator components, and a printed circuit board (PCB) connected to the one or more actuator components via the sensing layer, the PCB configured to initiate a signal in response to the sensing layer detecting change of displacement in the frame.

BRIEF DESCRIPTION OF THE DRAWINGS

FIG. 2A illustrates a side profile view of the mobile device with the transducer in an alternative embodiment.

FIG. 2B illustrates a first alternative embodiment of post portion of an actuator in transducer.

FIG. 2C illustrates a second alternative embodiment of post portion of an actuator in transducer.

FIG. 2D illustrates a third alternative embodiment of post portion of an actuator in transducer.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure discussed technology utilize to create sensing and 3D haptic feedback for button replacement and/or other similar applications. One example of button replacement may be the replacement of mechanical buttons on electronic devices, such as a smart phone or a multimedia system of a vehicle. The technology may create an in-plane and out of plane sensation to the skin/finger when pressed through displacement/vibration for haptic feedback. Thus, sensing functionality can also be integrated in the same design to detect when the button is pressed. The sensing and actuating element can be either standalone or integrated with the readout chip.

3D haptic experience may be added in addition to simply sensing technology. The 3D haptic experience can be generated through in-plane vibrations in addition to out-of-plane displacement/vibrations. The traditional push button has out-of-plane haptics but lack the in-plane haptics. The actuation may include piezoelectric actuation, as well as actuation by electromagnetic, electrostatic, shape-memory alloy, and other similar methods that can generate sufficient vibrations in all directions (e.g., in-plane and out-of-plane movement). In addition, other applications beside pushbutton replacement can include any human machine interface (HMI) devices.

A 3D haptics experience can be generated through in-plane vibrations in addition to out-of-plane displacement/vibrations. A traditional push button has out-of-plane haptics, but lacks in-plane haptics. The disclosure can be divided into three main parts: (1) In-plane vibration, (2) out-of-plane vibration, and (3) sensing. As described below, there may be multiple configurations of the transducers.

Figure 1A:
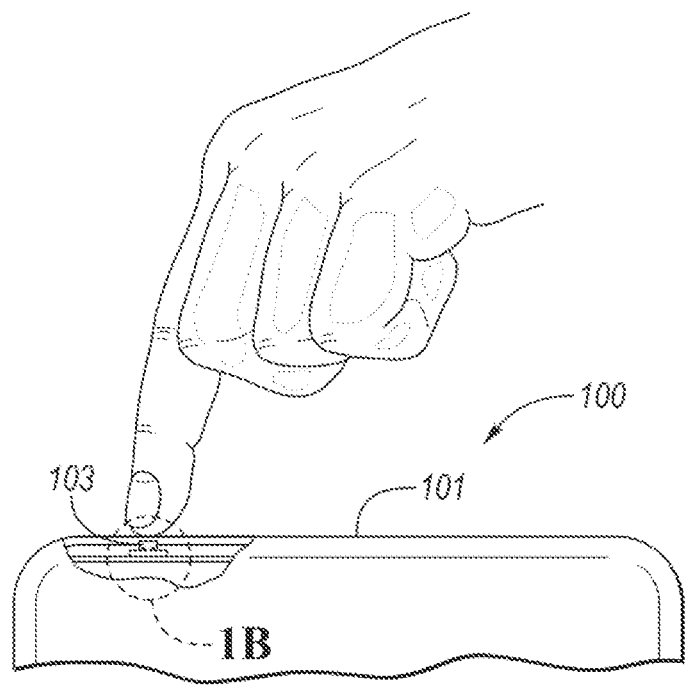
FIG. 1A illustrates a side profile view of a mobile device with a transducer with three-dimensional haptic feedback on a mobile device.
Figure 1B:
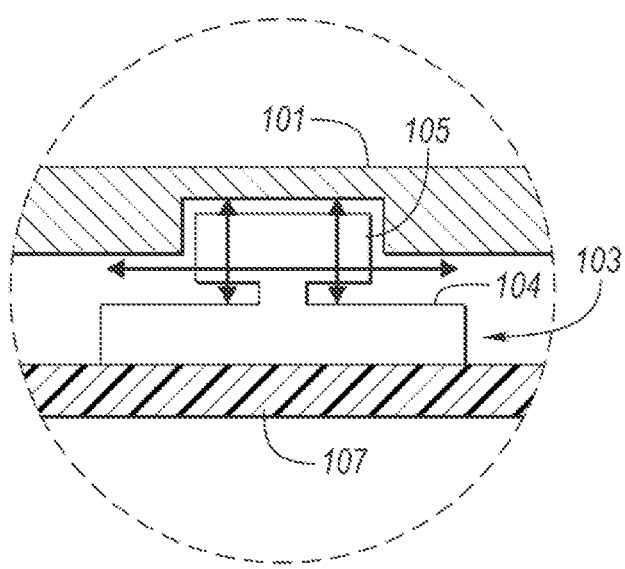
FIG. 1B illustrates a zoomed side profile view of the mobile device including the transducer 103.

FIG. 1A depicts a side profile view of the 3D haptic application on a mobile device 100. FIG. 1B depicts a zoomed-in side profile view of the mobile device 100 showing the transducer 103. As shown, a user may press on a frame 101, rather than a button itself, to actuate an area. As shown in the close up, the phone frame may include a cavity to encompass a portion of the transducer 103. The frame 101 may include any type of metal or plastic frame, or any other type of surface such as a display panel or glass panel. The frame may include a cavity that may house a portion of the transducer 103, such as an actuator component 105. The actuator component 105 may include various portions that allow for both in-plane and out-of-plane movement that allows for 3D haptic feedback that includes both in-plane and out-of-plane vibration. In-plane vibration (e.g., parallel directional movement with respect to the frame) in addition to out-of-plane (e.g., up and down out of the frame) displacement/vibration can create other haptic feedbacks than traditional out-of-plane only vibration. The recess or cavity in the frame 101 may be made to fit a protruding structure (e.g., the actuator component 103). The recess or cavity may thus be similar in shape to the protruding structure of the actuator component 105. The protruding structure of the actuator component may be connected to a base of the actuator component 105 that sits outside the cavity and underneath the frame.

The in-plane vibration has advantages because it can be used to generate a different type of haptic feedback through changes in frictional force between a user's skin and the button or device surface. Thus, the lateral vibration created by the in-plane vibration may be "banging" by the transducer structure in the in-plane direction with the device frame. In one example, the transducer 103 may include only in-plane movement, but not out-of-plane movement.

The cavity within the frame 101 may allow for added vibration coupling and feedback for in-plane vibration. The frame 101 may include a gap that is defined by open space between the cavity and actuator component. The gap between the frame 101 and the cavity may also be filled with materials to protect against wear and tear, but allow for good mechanical coupling. Thus, the material may be a polymer material or adhesive material, for example. In other embodiments, the gap of the cavity may simply be filled with air.

In one example, the location of the sensing electrode, with capacitive sensing that can sense changes in displacement of a metal frame. The metal frame may include a cavity that encompasses around the electromechanical actuator. Specifically, the cavity may encompass the post of the actuator component 103 of the transducer. Although the preferred embodiments may include piezoelectric actuation, the actuation method can also be realized with other methods such as electromagnetic, electrostatic, shape-memory alloy, and etc. as long as it can generate sufficient vibrations in all directions to create the in-plane and out-of-plane haptic feedback. In alternative embodiments, additional mass can be added to the actuator component 103 or the transducer to achieve stronger vibration feedback to the area of the frame where the virtual button is located. For example, if the mass is increased while maintaining velocity, stronger haptic feedbacks can be felt at the location of the vibration.

FIG. 2A illustrates a side profile view of the mobile device with the transducer in an alternative embodiment. The frame 101 is shown with various cavity sets and post configurations. In one example, the frame 101 or touch panel may include a singular cavity that is allowed for the post to occupy. The "post" 105 or protruding portion 105 of the actuator component 104 may be a physical piece of the actuator that is located in the frame that allows for actuation of the input. The structure of the transducer (e.g., the sensor and actuator) which may contact to the frame (e.g., via the cavity) can be made of a single post or multiple posts which are interdigitated with the recess of the frame. This may allow for good mechanical coupling, as well as provide different localized haptic feedbacks. The structure of the frame which are the weakest in the mechanical strength will feel the highest vibrations and vice versa. With this, different designs of the structure can be used to create different haptic feedback patterns. The larger the overlapping contact surface between the transducer and the frame, the better the mechanical coupling.

FIG. 2B is an embodiment of the electromechanical actuator that includes a post configuration with nine individual posts. The nine individual posts 105 may be each in an individual cavity of the frame or panel of the mobile phone (e.g., nine cavities), one large cavity encompassing all posts, or any other grouping of cavities. By increasing the number of individual posts, the feedback may allow for additional pin-point accuracy in response to the input from the customer.

FIG. 2C is an embodiment of the electromechanical actuator that includes a post configuration with four individual posts (e.g., protruding portions of the actuator). The four individual posts 105 may be each in an individual cavity of the frame or panel of the mobile phone (e.g., four cavities), one large cavity encompassing all posts, or any other grouping of cavities. As shown in FIG. 2C, the posts may be displaced to have two sets of parallel posts surrounding the outside of the cavity or cavities, leaving a middle section empty. By increasing the number of individual posts, the feedback may allow for additional pin-point accuracy in response to the input from the customer.

FIG. 2D is an embodiment of the electromechanical actuator that includes a post configuration with seven individual posts. The seven posts 105 may be a different shape and size, as opposed to the posts in FIG. 2B-2C that are similar in size. While the parallel posts in FIG. 2C may class the middle section to be empty, the embodiment of FIG. 2D allows three additional posts to be placed in the middle section. Of course, one or two posts may be placed in that section in one embodiment. By increasing the number of individual posts, the feedback may allow for additional pin-point accuracy in response to the input from the customer, especially in the middle section of the layout of the cavity.

Figure 3A:
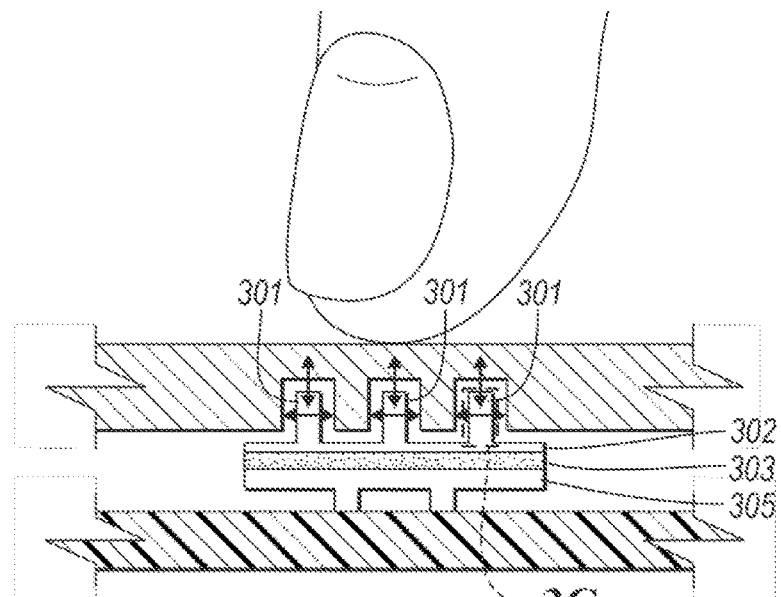
FIG. 3A illustrates a side profile view of the mobile device with the transducer in an alternative embodiment that includes a unimorph piezoelectric actuation method.
Figure 3B:
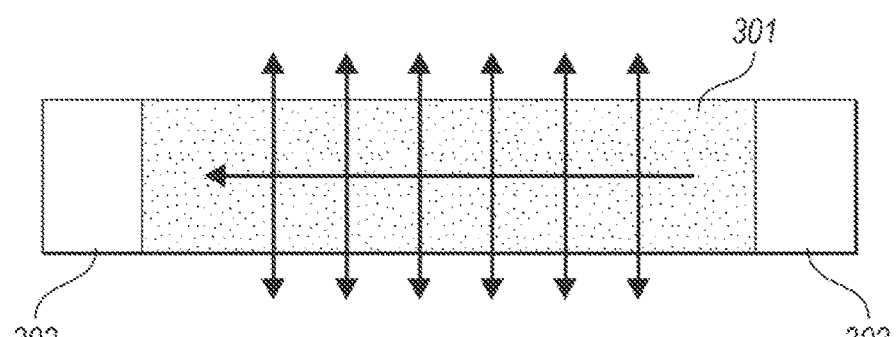
FIG. 3B illustrates an example of a zoomed in profile of a unimorph piezoelectric actuation method.
Figure 3C:
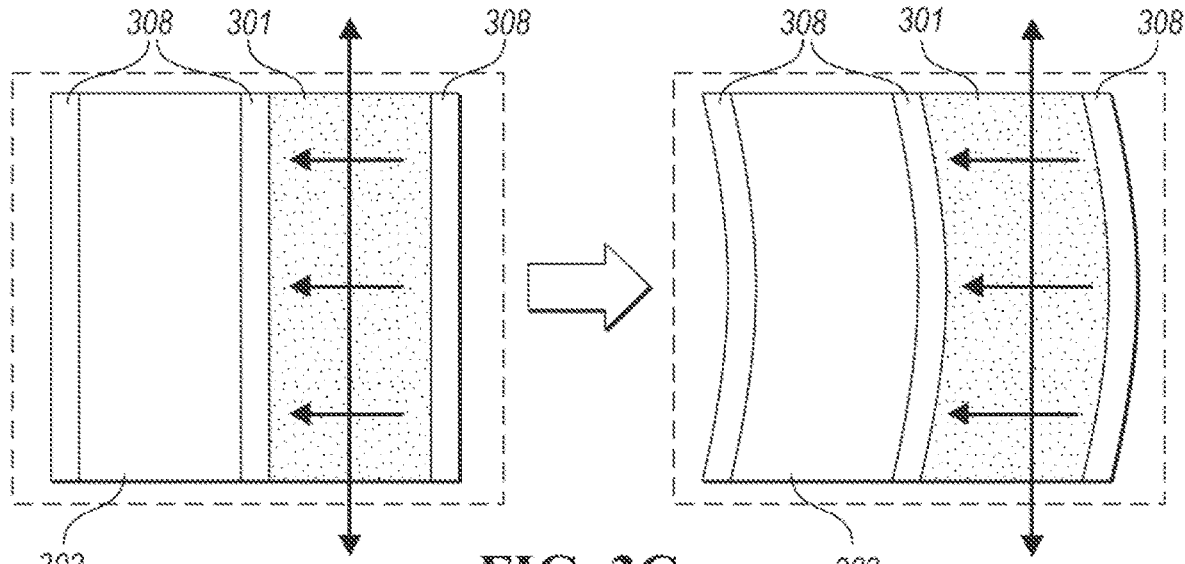
FIG. 3C illustrates an example of a unimorph piezoelectric during actuation.

FIG. 3A-3C is an example of a transducer that utilizes a unimorph piezoelectric actuation method. As shown in the figures, there may be three cavities or recesses within the phone frame in such an embodiment. However, any number of cavities may be utilized. With the unimorph actuation, the system may provide feedback in one direction in the in-plane feedback. The actuation may be electrostatic, piezoelectric, electromagnet, etc. In such a scenario, the post or protruding component may be created by a silicon piece or non-malleable structure that can bend. Thus, the feedback may be different than other electromechanical actuation methods. The non-malleable structure 302 (e.g., silicon structure that can bend based on the sensing layer 301 force) may be adjacent to a sensing layer 301 (e.g., that may be piezoelectric, electrostatic, etc.). The non-malleable structure may within the cavity of the frame and be adjacent to the sensing layer 301 in the protruding component of the 304 of the actuator component. Thus, the non-malleable material 302 may touch the sides of the frame (via the cavity), but the sensing layer 301 be in contact with the top of the cavity of the frame to be responsive to input at the frame (e.g., finger press). Thus, the haptic feedback may be provided at the sides of the cavity in the frame for in-plane vibration. As shown in the exploded view portion of FIG. 3, when a force is applied (or in other examples, an activation of input to receive feedback) to the transducer in the out-of-plane direction, the haptic feedback may occur in the in-plane movement and cause the non-malleable material 302 to bend. Thus, the non-malleable structure 302 may be located in the protruding component and located wholly or partly in the cavity of the frame. As such, the non-malleable material 302 of the actuator component may cause bending. In one embodiment, the actuator component base 305 may be below the sensing layer 303 in one embodiment. The out-of-plane actuation may be in any location within the actuator to perform unimorph out-plane actuation. In FIG. 3C, the left most thinner layer (e.g., non-malleable material 302) can be redundant or used as an electrode to apply ground or negative voltage, for example. At a high-level, the middle thinner layer 308 can also be ground or negative voltage and the right most layer can be applied to positive voltage.

Figure 4A:
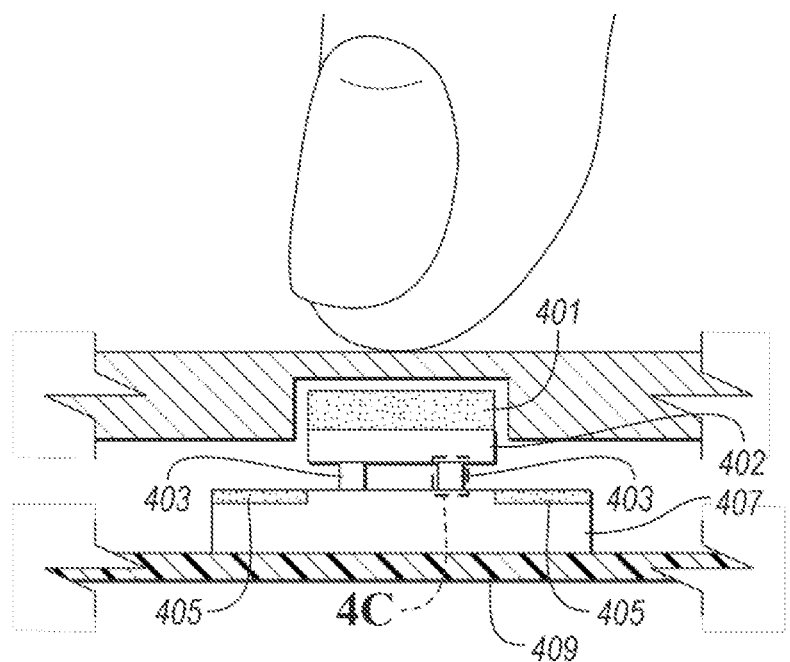
FIG. 4A illustrates a side profile view of the mobile device with the transducer in an alternative embodiment that includes a unimorph and bimorph piezoelectric actuation method.
Figure 4B:
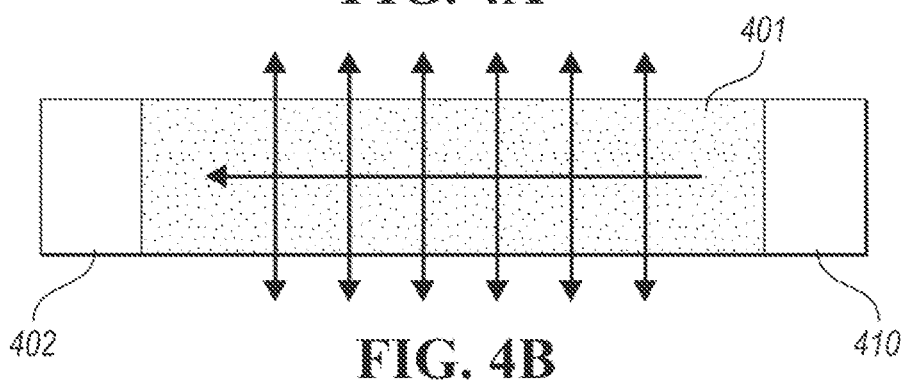
FIG. 4B illustrates a unimporh piezoelectric actuation method.
Figure 4C:
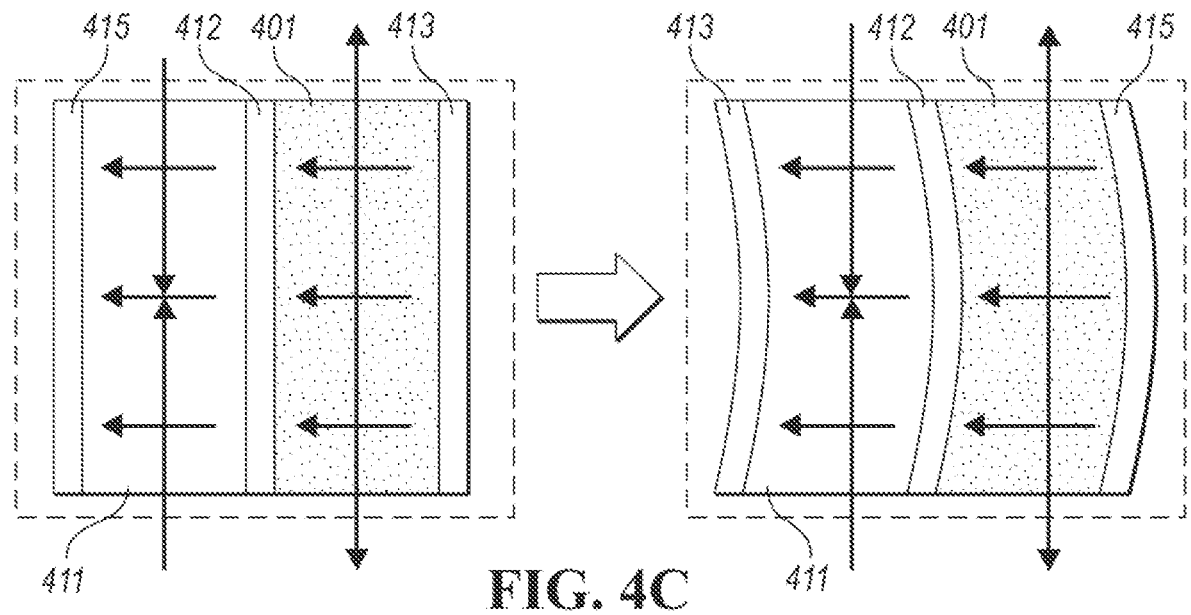
FIG. 4C illustrates a bimorph piezoelectric actuation method during actuation.

FIG. 4A-4C is an example of a bimorph piezoelectric actuation method. With the bimorph actuation, a cantilever may be used for actuation or sensing that may include two active layers. It can also have a passive layer between the two active layers. In contrast, a piezoelectric unimorph may only has one active (i.e. piezoelectric) layer and one passive (i.e. non-piezoelectric) layer. As such, different types of in-plane movement may be utilized for different haptic feedback. The actuation may be electrostatic, piezoelectric, electromagnet, etc. The post may include a sensing layer 401 as well as a rigid or non-malleable non-sensing material 402. In one example, the post or protruding portion of the actuator may be created by a silicon piece or non-malleable structure that can bend. In one example, there may be bimorph in-plane actuation with respect to the frame of the mobile device. Thus, the arrows that are in-plane movement with respect to the frame may refer to the polarization axis of piezoelectric. However, the arrows that are out of plane with respect to the frame may be an expansion or contraction motion of the non-malleable structure that can bend. As shown in the blown up portion, the bimorph in-plane actuation may include multiple sensing layers.

An out-of-plane actuator 401 may be present within a cavity of the frame, while the in-plane actuator 403 may be utilized to provide in-plane haptic feedback. Such a design as shown in FIG. 4 can have various number and shapes of the actuator but in this example, only two in-plane actuator are shown which will move the top part of the transducer (i.e. combination of out of plane actuator 401 and non-piezoelectric layer 402) left and right. The out-of-plane actuator may include unimorph out-of-plane actuation, for example.

Figure 6:
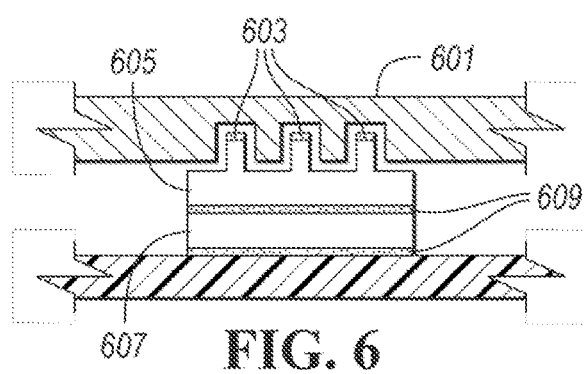
FIG. 6 illustrates a side profile view of the mobile device with the transducer in yet another alternative embodiment with sensing layers in various locations.

The transducer may also include one or more sensing components 405 that include impedance sensing (e.g. capacitive, inductive) as an example, shown in FIG. 4A. The one or more sensing components 405 may also be electromagnetic sensor, piezoelectric sensor, etc. The piezoelectric sensing can also be done utilizing the same transducer component 401. With similar principle, voltage can be applied to create displacement of the transducer 401. At the same time, any displacement of the transducer can generate voltage which can be sensed as an input determining a "press" of the button. Other possible locations for the sensing layer may be utilized (as shown in FIG. 6). Any other type of location of the sensing electrode may also be utilized. Component 402 can also be a sensing layer instead of a dummy material for the purpose of increasing mass or enhancing structural integrity of 401. The component 402 may sense changes in displacement of the metal frame utilizing capacitance, for example. The sensing components 402 may be located on an actuator component base 405. In an alternative embodiment, the actuator component base 405 may be an integrated read out chip, for example.

The actuator component base 407 or any other portion may be connected directly or indirectly to a PCB 409. For example, the PCB may be soldered to the actuator component (e.g., via the base 407) or may be connected by a wired connection (e.g., ribbon electrical cable). Rather than utilizing a PCB 409, the system may also include a microcontroller or any other type of processor or microprocessor, ASIC controller, etc. An out-of-plane vibration can be incorporated to the in-plane vibration at the same time to create 3D haptics. The location of the out of plane actuator (e.g., a piezoelectric actuator), may be positioned strategically to allow seamless integration with both the in-plane actuators 403, sensing components 405 and readout circuit (e.g., PCB 409).

FIG. 4C illustrates a bimorph piezoelectric actuation method. With respect to FIG. 4C, the structure may be a bimorph actuation. In this embodiment, piezoelectric layer 411 may be included in the transducer. The piezoelectric layer 411 can be the same piezoelectric material as other layers, as what as long as it acts differently when different voltage is applied. The piezoelectric layer 411 can expand when positive voltage is applied and shrinks when negative voltage is applied. The small arrows shown at a first piezoelectric layer 401 within the piezo layer shows the polarity of the layers. In one embodiment, to allow bimorph actuation to work, there may be three electrodes sandwiching the two piezoelectric layers, meaning the outer two thinner layers 413, 415 are electrodes as well as the middle thinner layer 412 are electrodes. Depending on the polarity of the electrodes, the piezoelectric layer in between the electrodes will either expand or shrink. For example, the left most electrode can be connected to the positive voltage while the middle electrode can be connected to ground and the right most electrode can be connected to negative electrode. With the different polarity configurations, the piezoelectric layer either expand or shrink. The vertical arrows shows the expansion or shrinkage of the piezoelectric material.

Figure 5:
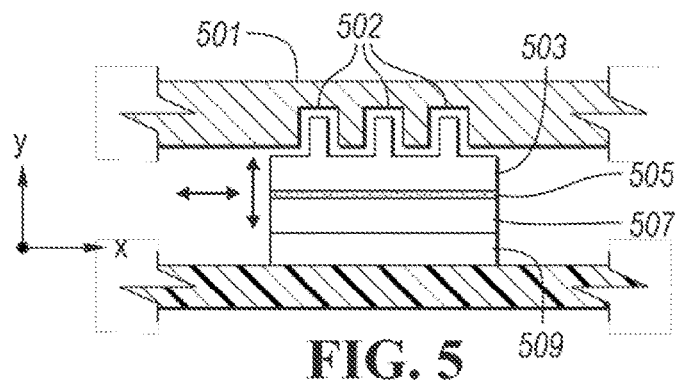
FIG. 5 illustrates a side profile view of the mobile device with the transducer in another alternative embodiment.

FIG. 5 is an example of an alternative embodiment of a transducer. The frame 501 of the mobile phone may include cavities 502. The cavities 502 may include "posts" or other portions of a mass 503 that may be utilized to receive feedback from a user input at the mobile phone (e.g., the frame). In an alternative embodiment, the cavities 502 may include one or more cavities within the frame. Furthermore, the cavities 502 may include the protruding portion of the transducer within the frame in either all the cavities, or some of the cavities. The mass 503 may be a rubber material, or any other material, such as a non-malleable material. The electromechanical actuator may include a sensing layer 505. In addition, it may include a 3D actuator or sensor 507. The 3D actuator or sensor 507 may be an individual actuator, sensor, or combined. The 3D actuator or sensor 507 may provide that haptic feedback in in-plane, out-of-plane, or both directions with respect to the frame of the phone. The 3D actuator can include piezoelectric, shape-memory alloy, electrostatic, electromagnet, etc., which can create displacement in all three axis (in-plane and out-of-plane). Thus, the 3D actuator 507 may provide additional haptic feedback or vibrations in either the in-plane or out-of-plane movement (with respect to the frame 501). The 3D actuator and sensor may be mounted to the backside of the phone. The 3D actuator may be schematically shown in FIG. 5 to include a combined D33 piezo actuator for out-of-plane vibration and a piezo, electrostatic, or electromagnetic actuator for in-plane vibration. The PCB 509 may also be mounted on the backside of the phone, thus the transducer may provide vibration to both a surface and backside of the frame 501 of the phone. The PCB 509 may be mounted to the backside of the phone frame via a solder, adhesive, or any other method.

FIG. 6 is an example of another alternative embodiment of a transducer. In such an embodiment, the illustrations shows that the sensing layers 603 may be found in almost any location of the transducer, such as above the non-malleable material 605 in the cavity section of the frame 601. In yet another embodiment, the sensing layer may be between the mass 605 (e.g, non-malleable material) and the 3D actuator 607. In yet another embodiment, the sensing layer 603 may be between the 3D actuator 607 and the bottom of the phone frame 609. The closer the sensing layer 603 may be to the frame, the more heightened the sensitivity may be. The sensing layer can be on top of the interdigitating structures, between actuator and protruding mass or between the actuator and the mount. One sensing layer can be used or many smaller separated layers. The separated layers may have the advantage to detect more tilted actuation from the user, like a rocker switch. The sensing layer 603 may be any type of sensing layer (piezoelectric, electromagnetic, electrostatic, etc.) and may be located in any location on the transducer (e.g., near the top of the frame or at the bottom of the phone frame 609. However, the closer the sensing layer 603 is to where the force is applied, a greater signal may be initiated by the transducer. If the sensing layer 603 is further away from the force (e.g., near the bottom of the phone frame versus the cavity when a force is applied at or near the cavity), the less strong the signal is.

Figure 7A:
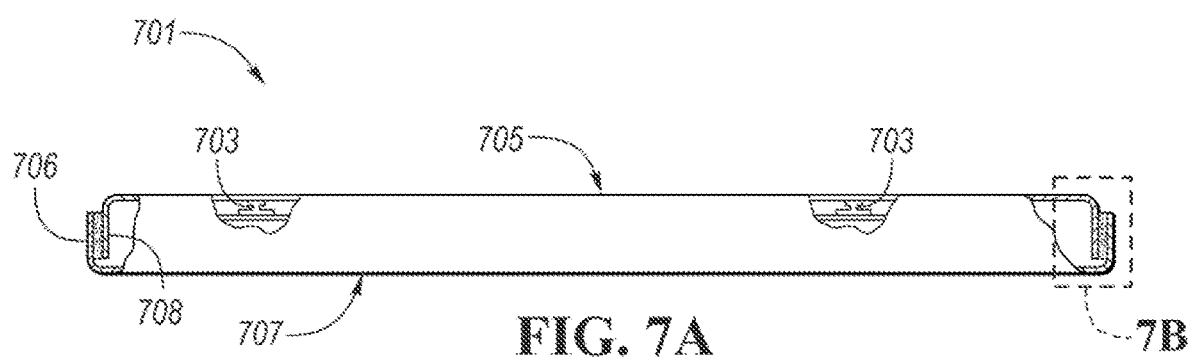
FIG. 7A is an example of a side-view profile of a cutaway of a mobile device 701.
Figure 7B:
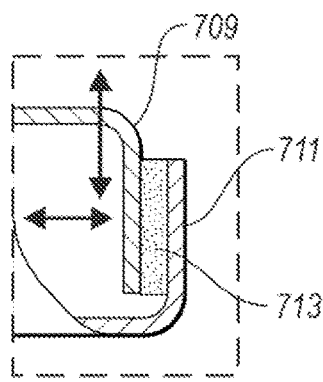
FIG. 7B is a zoomed-in view of a first frame portion and a second frame portion of a mobile device joined by a flexible mount.

FIG. 7A is an example of a side-view profile of a cutaway of a mobile device 701. FIG. 7B is a zoomed-in view of a first frame portion and second frame portion of a mobile device joined by a flexible mounting material. The mobile device 701 may include a frame that includes a first frame portion 705 and a second frame portion 70 The first frame portion 705 may include a cavity that encompasses the electromechanical actuators 703 or transducers Any of the electromechanical actuators 703 or transducers described above would work. The first frame portion may include a surface portion that includes a display panel or touch display panel. The first frame portion 705 may also include a top portion 708 and a bottom portion 709. As shown in FIG. 7, the first frame portion 705 may have the top portion 708 and bottom portion 709 that are not directly connected via a back portion or one uniform frame piece. Instead, the second frame portion 707 may be connected to the first frame portion 705 via the second frame's top portion 706 and bottom portion 711 via a flexible mounting 713. The flexible mounting material 713 may be any flexible material, polymer, or adhesives which allows for lateral and vertical movement via such connection while maintaining connection between the first frame portion and the second frame portion 707. A flexible mounting 713 of the surface may allow for lateral and vertical movement via such a connection. As such, when a button is activated on the top portion, the a portion (e.g., a side of the frame) of the phone may move. When the button near 703 is actuated, only the first frame portion 705 may vibrate. And if similarly, there is a button on the other side of frame, only the second frame portion may vibrate. The disconnection of the frame with flexible material 713 as the bridging material may be to provide structural integrity to the whole device but have the capability of individually creating vibration on just one side of the frame 705. Thus, the flexible mounting portion may connect the bottom portion of the first frame portion with the bottom portion of the second frame portion. As such, when an input is received via the customer utilizing the mechanical actuator (e.g., touching a button or screen to activate a function or command), the haptic feedback may not only be applied near the actuator, but the one side of the edge of the phone may vibrate.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A transducer, comprising:
   one or more actuator components configured to be encompassed by a cavity of a frame, wherein the one or more actuator components are configured to allow in-plane and out-of-plane movement with respect to the frame and configured to create haptic feedback in the in-plane and out-of-plane movement to the frame in response to a finger press;
   one or more sensing layers configured to detect changes of displacement in the frame in response to the finger press, wherein the sensing layer is connected to the one or more actuator components.

2. The transducer of claim 1, wherein the one or more actuator components is a piezoelectric actuator.

3. The transducer of claim 1, wherein the one or more actuator components is an electromagnetic actuator or an electrostatic actuator.

4. The transducer of claim 1, wherein the electromechanical actuator includes a three-dimensional actuator mounted adjacent the sensing.

5. The transducer of claim 1, wherein the one or more actuator components includes a non-malleable material located in the cavity of the frame.

6. The transducer of claim 1, wherein the one or more actuator components include a first side and second side connected by a top side, wherein the non-malleable material located in the cavity of the frame is between the first side and second side.

7. The electromechanical actuator of claim 6 wherein the first side and second are generally parallel to one another.

8. The transducer of claim 1, wherein the transducer includes a gap that is defined by open space between the cavity and actuator component.

9. The transducer of claim 1, wherein the cavity is at least partly or completely filled by a polymer material or adhesive material.

10. The transducer of claim 1, wherein the transducer is connected to a printed circuit board that connect to the one or more actuator components via the sensing layer, wherein the printed circuit board is configured to initiate a signal in response to the sensing layer detecting a change of displacement in the frame.

11. The transducer of claim 1, wherein the transducer is connected to a microcontroller connected to the one or more actuator components via the sensing layer, the microcontroller configured to initiate a signal in response to the sensing layer detecting change of displacement in the frame and initiating a vibration of the transducer.

12. The transducer of claim 1, wherein the one or more actuator components are configured to create haptic feedback in the in-plane or out-of-plane movement to the frame.

13. The transducer of claim 1, wherein the frame includes a touch panel.

14. A mobile device, comprising:
    a frame defining an outer edge of a phone, wherein the frame includes a cavity;
    one or more actuator components configured to be encompassed by the cavity of the frame, wherein the one or more actuator components are configured to allow in-plane and out-of-plane movement with respect to the frame and configured to create haptic feedback in the in-plane movement at a first instance and out-of-plane movement to the frame at a second instance in response to input at the frame; and
    one or more sensing layers configured to detect changes of displacement in the frame, wherein the sensing layer is connected to the one or more actuator components.

15. The mobile device of claim 14, wherein the one or more actuator components is an electromagnetic actuator.

16. The mobile device of claim 14, wherein the electromechanical actuator includes a three-dimensional actuator mounted between the sensing layer and the printed circuit board.

17. The mobile device of claim 14, wherein the frame includes a first portion and a second portion, wherein the first portion includes the cavity, and the second portion is connected to the second portion via a flexible material.

18. The mobile device of claim 14, wherein the one or more actuator components are configured to create haptic feedback in the in-plane movement at a first instance and out-of-plane movement to the frame at a second instance in response to a signal initiated by a microcontroller of the mobile phone.

19. The transducer of claim 18, wherein transducer includes a three-dimensional actuator mounted between the sensing layer and the PCB.

20. A transducer, comprising:
    one or more actuator components configured to protrude into a cavity of a frame, wherein the one or more actuator components are configured to allow in-plane and out-of-plane movement with respect to the frame and configured to create haptic feedback in the in-plane at a first instance and out-of-plane movement at a second instance to the frame in response to one or more inputs at the frame;
    a sensing layer configured to detect changes of displacement in the frame, wherein the sensing layer is connected to the one or more actuator components; and
    a printed circuit board (PCB) connected to the one or more actuator components via the sensing layer, the PCB configured to initiate a signal in response to the sensing layer detecting change of displacement in the frame.

* * * * *